(12) United States Patent
Wloch et al.

(10) Patent No.: US 10,459,617 B2
(45) Date of Patent: Oct. 29, 2019

(54) METHOD FOR ADJUSTING A RANGE OF NUMERICAL VALUES AT AN INPUT DEVICE

(71) Applicant: Lenze Automation GmbH, Aerzen (DE)

(72) Inventors: Robert Wloch, Bad Pyrmont (DE); Olaf Goetz, Brakel (DE)

(73) Assignee: Lenze Automation GmbH, Aerzen (DE)

( * ) Notice: Subject to any disclaimer, the term of this patent is extended or adjusted under 35 U.S.C. 154(b) by 234 days.

(21) Appl. No.: 15/431,228

(22) Filed: Feb. 13, 2017

(65) Prior Publication Data
US 2017/0235468 A1    Aug. 17, 2017

(30) Foreign Application Priority Data

Feb. 11, 2016    (DE) .................. 10 2016 001 481

(51) Int. Cl.
| | | |
|---|---|---|
| *G06F 3/048* | (2013.01) | |
| *G06F 3/0484* | (2013.01) | |
| *G06F 3/0488* | (2013.01) | |
| *G06T 11/00* | (2006.01) | |
| *G06F 3/038* | (2013.01) | |

(52) U.S. Cl.
CPC ........ *G06F 3/04847* (2013.01); *G06F 3/0488* (2013.01); *G06T 11/001* (2013.01); *G06F 3/038* (2013.01)

(58) Field of Classification Search
CPC .. G06F 3/04847; G06F 3/0362; G06F 3/0488; G06F 3/038; G06F 2203/0339; G06T 11/001
See application file for complete search history.

(56) References Cited

U.S. PATENT DOCUMENTS

| | | | |
|---|---|---|---|
| 7,117,450 B1 * | 10/2006 | Chaudhri | G06F 3/04847 |
| | | | 715/787 |
| 7,499,046 B1 * | 3/2009 | Wright | G06F 17/30029 |
| | | | 345/418 |
| 2008/0184167 A1 * | 7/2008 | Berrill | G06F 3/04847 |
| | | | 715/833 |
| 2010/0306694 A1 | 12/2010 | Conzola et al. | |
| 2010/0306704 A1 * | 12/2010 | Cotterill | G06F 3/04847 |
| | | | 715/833 |

(Continued)

FOREIGN PATENT DOCUMENTS

| | | |
|---|---|---|
| DE | 101 33 135 A1 | 1/2003 |
| DE | 10 2012 019 942 A1 | 4/2014 |
| DE | 10 2014 010 302 A1 | 1/2016 |

*Primary Examiner* — Andrew T Chiusano
(74) *Attorney, Agent, or Firm* — Crowell & Moring LLP

(57) ABSTRACT

In a method for adjusting a range of numerical values at an input device for configuration or selection of the components of an electrical drive system with regard to a parameter as numerical value, the input device has a display. On the display, a minimum value and spaced apart from it a maximum value are displayed variably for the numerical value, wherein the minimum value and the maximum value form or span between them a range of numerical values. By way of a zooming function, the minimum value and the maximum value can be altered, increased or reduced in such a manner that the adjusting of a range of numerical values can take place more easily and more accurately.

24 Claims, 2 Drawing Sheets

(56) References Cited

U.S. PATENT DOCUMENTS

| | | | |
|---|---|---|---|
| 2010/0333016 A1* | 12/2010 | Attwood | G06F 3/04855 |
| | | | 715/784 |
| 2013/0097551 A1* | 4/2013 | Hogan | G06F 3/0488 |
| | | | 715/780 |
| 2014/0282252 A1* | 9/2014 | Edwards | G06F 3/04847 |
| | | | 715/833 |
| 2015/0020016 A1* | 1/2015 | Hanumara | G06F 3/04847 |
| | | | 715/771 |
| 2017/0134872 A1* | 5/2017 | Silva | G06F 3/165 |

\* cited by examiner

METHOD FOR ADJUSTING A RANGE OF NUMERICAL VALUES AT AN INPUT DEVICE

CROSS REFERENCE TO RELATED APPLICATION

This application claims priority under 35 U.S.C. § 119 from German Patent Application No. 10 2016 001 481.4, filed Feb. 11, 2016, the entire disclosure of which is herein expressly incorporated by reference.

BACKGROUND AND SUMMARY OF THE INVENTION

The invention relates to a method for adjusting a range of numerical values at an input device in order to configure or select mainly components of an electrical drive system with regard to a parameter as numerical value. Thus, for example, from a large bandwidth of power controllers having very different design powers as parameters, it should be possible to pick out and display those within a particular range of the design power.

Input methods are widely known in the prior art, for example from DE 10133135 A1 for cooking appliances. In this context, a numerical value is set on a touch-sensitive operating panel by means of a finger on a so-called slider. In order to be able to perform an accurate setting within a predetermined large range of numerical values, a so-called zoom function is provided. Activation thereof can be adjusted by sweeping section by section or once or several times over the slider with a finger. However, this is complicated, as a rule.

The invention is based on the object of providing a method, mentioned initially, for adjusting a range of numerical values, by means of which problems of the prior art can be solved and it is possible, in particular, to adjust a range of numerical values at an input device in a better, intuitive and practical manner.

This object is achieved by a method in accordance with embodiments of the invention.

In the method for adjusting a range of numerical values at an input device, in order to configure or select components of an electrical drive system with regard to a parameter as numerical value, a minimum value for the numerical value and spaced apart from that a maximum value for the numerical value are shown on a display of the input device, which can vary or are variable, respectively. The minimum value and maximum value form between themselves a range of numerical values, wherein said parameter or said parameters can lie within this range of numerical values. On the display, the numerical values for the parameter of the various components are displayed which lie within the range of numerical values. In this context, these numerical values can be displayed directly between minimum value or maximum value. Alternatively, they can be represented together with the components identified by these parameters to the right or generally next to them. In the method, the steps mentioned and explained in the text which follows are performed. A minimum-value slider and a maximum-value slider are displayed in each case as a graphical element. The minimum-value slider and the maximum-value slider can illustrate the minimum value and the maximum value at the beginning of the method or, respectively, are as far apart from one another as possible with a particular original spacing and span between them the range of numerical values, as it were. To change the range of numerical values, the sliders are movable, preferably both of them. In this context, they are advantageously movable toward and away from each other so that both the minimum value and the maximum value can be reduced and enlarged. The minimum value slider is therefore moved toward the maximum-value slider or away from it. In a similar form, the maximum-value slider can be moved toward the minimum-value slider or away from it. In this process, the minimum value is reduced in the case of moving the minimum-value slider away from the maximum-value slider if this is possible at all. Advantageously, reducing the minimum value is not possible at the beginning of the adjusting process since it is advantageously set originally at zero. The minimum value is enlarged in the case of moving the minimum-value slider toward the maximum-value slider. Thus, a new minimum value can be obtained by moving or displacing the minimum-value slider.

In a similar form, the maximum-value slider can be moved or displaced. If it is moved toward the minimum value slider, the maximum value is reduced. If the maximum-value slider is moved away from the minimum-value slider, the maximum value is enlarged. Thus, a new maximum value can be set starting from a maximum value originally specified at the beginning of the method.

By changing the minimum value and/or the maximum value in the manner described above, the original range of numerical values can be changed and a new range of numerical values formed or spanned, respectively. In this process, this new range of numerical values is determined by the new minimum value and/or the new maximum value. Although their space from one another can theoretically remain the same, advantageously however a new space is given between minimum-value slider and maximum-value slider. Particularly advantageously, this new space is slightly less than the original space. When moving minimum-value slider or maximum-value slider toward one another, the range of numerical values is thus reduced. When moving minimum-value slider or maximum-value slider away from one another, the range of numerical values is enlarged. This thus corresponds to a type of zooming function for a more accurate adjustment or for better finding of numerical values or parameters, respectively, in between and of the components belonging to them. Furthermore, a range of selection for components by means of their parameters may thus be reduced, enlarged or simply displaced.

The parameters of components, the numerical values of which are within the new range of numerical values, can also be displayed. This can be done either directly between minimum-value slider and maximum-value slider or, alternatively, adjacently, as mentioned before.

Advantageously, the display also displays the components, the parameters of which are within the current range of numerical values in numerical value. In this context, the components can be displayed in accordance with their actual physical embodiment on the display, for example in a type of listing or order with spacing with respect to the range of the display with minimum-value slider and maximum-value slider. Thus, it is not only their parameters that can be displayed between minimum-value slider and maximum-value slider but also the components themselves. By selection of one of the components displayed, the electrical drive system can then be configured accurately.

In a possible development of the invention, the parameters can be displayed in the new range of numerical values by specification of their numerical value and/or by representation of a graphical element at the location corresponding to the numerical value of the respective parameter in the new range of numerical values. As a graphical element, a dash or a strip with course transversely to the direction between minimum-value slider and maximum-value slider can advantageously be provided, for example also with special color for better recognizability. Additionally, the corresponding numerical value of this parameter can be displayed, advantageously above or below. Alternatively, only the numerical value can be displayed at the corresponding location in the new range of numerical values.

In a possible development of the invention, on the display, a so-called strip of numerical values which extends between the minimum-value slider and the maximum-value slider can be shown. In particular, such a strip of numerical values extends between the original location of minimum-value slider and maximum-value slider. In this context, it can be provided that it remains unchanged while the sliders are moved. In particular, the strip of numerical values can also remain unchanged if, which will still be explained in greater detail, the minimum-value slider and/or the maximum-value slider are at a slightly different location, their spacing, in particular, is reduced. Such a strip of numerical values is advantageously designed as a wide strip with a distinct border, so that it can represent a narrow elongated rectangle. Advantageously it also serves the purpose that aforementioned graphical elements, dashes or strips can be represented better on it for the numerical value of a parameter. Furthermore, the strip of numerical values can optically form a type of rail or guide in order to be able to move or displace the minimum-value slider and the maximum-value slider thereupon so that the suggestion of a mechanical slide regulator is given.

In a development of the invention, it is possible that at said strip of numerical values aforementioned dashes or strips which correspond to the parameter are displayed. Furthermore, it is advantageously possible that an area of the strip of numerical values between the dashes or strips which are widest apart in each case is colored, as particular graphical identification. Thus, the area in which there are actually components for the electrical drive system, the parameters of which are between minimum-value slider and maximum-value slider in the current range of numerical values, or between the minimum values and maximum values set by them, is indicated to an operator. Alternatively, the entire area of the strip of numerical values between minimum-value slider and maximum-value slider could be colored. But then, an information content with regard to the intermediate parameters of components would be less.

Advantageously, the changing of the respective minimum value and/or maximum value can be carried out in a manner dependent on the duration with which the respective slider has been moved or deflected away from its original location, that is to say the longer it is deflected, the more the numerical value changes for the respective minimum value or maximum value. This can take place linearly with time or else increasingly or with acceleration so that the change becomes faster with increasing duration. Thus, numerical values which differ distinctly from one another can be reached more quickly. Alternatively, the speed of the change can depend on how far the slider has been removed or pushed away from the original location or how far it has been attempted to move it away from this. If the slider is only moved a small distance or a few mm away, advantageously 1 mm to 5 mm, the speed of the change is low. If, in contrast, the slider is moved a great distance or some mm away, advantageously 5 mm to 15 mm, the speed of the change is great.

In a possible development of the invention, the display or the input device, respectively, has a screen, wherein adjusting or changing the range of numerical values or moving the minimum-value slider and/or the maximum-value slider can be carried out by means of a peripheral input device such as a mouse, track pointer or touchpad. By this means, the pointing element can be moved on a screen in each case in familiar manner. Advantageously, the input device also has at least one switching device or the like, for example a mouse key or a pressing function on a touchpad. Thus, actions or operating processes can also be triggered in familiar manner.

In a further possible embodiment of the invention, the display has a touch-sensitive screen, also known as a touch screen. Changing of the range of numerical values or moving the minimum-value slider and/or the maximum-value slider can then take place by placing a finger onto the touch-sensitive screen as is known per se. Thus, a finger can be placed over the minimum-value slider or the maximum-value slider. By subsequent moving of the slider toward the other one or away from it, they can be moved in the aforementioned manner or, respectively, the range of numerical values can be enlarged or reduced. The pointing element can then be advantageously controllable by the finger, a further switching device or the like is not needed as is known from such touch-sensitive screens.

In a development of the invention, it can be provided that, when moving the minimum-value slider and the maximum-value slider, either by an aforementioned pointing element, for example a mouse pointer, or by a finger placed on a touch-sensitive screen, releasing the slider, just like lifting a finger, have the effect that the numerical value existing at this instant is accepted as new minimum value or new maximum value. Since on changing the minimum value and the maximum value, the corresponding sliders in each case themselves are advantageously graphically or optically moved slightly on the display, for example, 0.1 mm to 10 mm or even 20 mm in order to display their change in a particular direction, i.e. away from the other slider or toward it, the slider, after it has been released can automatically return to its original location. Thus, it acts as if it is virtually attached to a rubber band and returns by itself to its starting position. Alternatively it can be provided in a development of the invention that the minimum-value slider or the maximum-value slider after being moved and released do not return to their original location but to a location shortly before their original location or, respectively, the minimum-value slider is displaced slightly toward the maximum-value slider and the maximum-value slider is correspondingly displaced slightly toward the minimum-value slider. The spacing for the new location for the sliders with respect to their respective original location can be 1% to 20% of the original spacing between the sliders. Advantageously, these are 3% to 8%. Thus, a new spacing between minimum-value slider and maximum-value slider is between 60% and 99% of the original spacing between them, advantageously between 80% and 90%. This thus means that minimum-value slider and/or maximum-value slider are offset slightly toward one another or toward the inside if the minimum value and/or the maximum value have been changed or changed toward one another, respectively. Thus, this type of change is displayed better for an operator.

In a possible development of the invention with the slight offset of minimum-value slider and maximum-value slider, described above, after changing minimum value and maximum value, it may be provided that a reenlargement of the minimum value functions in exactly the same way, as does a reduction of the maximum value. The spacing between the two will then not be changed again at their respective new location.

In a development of the invention it may be provided that in the case of the above-described offset of minimum-value slider and maximum-value slider from their original location a reduction of the minimum value occurs after previous enlargement due to the fact that the minimum-value slider is moved away from the maximum-value slider to its original location. Since in practice, there will not be very much space available for this, unlike for moving the minimum-value slider toward the maximum-value slider, as a rule, it can be provided that this is valued as a type of key command or so-called toggle command. Thus, a single such moving of the minimum-value slider away from the maximum-value slider can reduce the minimum value by a predetermined proportion of the current minimum value. This can be 5% to 50%, especially 10% to 20% of the current minimum value. As the reference variable, the spacing between minimum-value slider and maximum-value slider or the range of numerical values spanned by it can also be used instead of the current minimum value. Alternatively, it could be provided that the minimum value is set back to the minimum value set directly before.

In similar form, the maximum value can be enlarged again in a development of the invention after having been reduced previously if the maximum-value slider is moved away from the minimum-value slider to the original location of the maximum-value slider. This moving can be a maximum distance away from the minimum-value slider. A single such moving of the maximum-value slider can enlarge the maximum value by a predetermined proportion of the current maximum value, alternatively by a predetermined proportion of the spanned range of numerical values between minimum value and maximum value. In the same way as described previously for the minimum value, these can be 5% to 50%, particularly 10% to 20%.

In an alternative development of the invention, it can be provided that in the case of an attempted moving of the minimum-value slider or of the maximum-value slider by means of the pointing element away from each other, the minimum-value slider and the maximum-value slider cannot be moved out beyond their in each case original location on a strip of numerical values on the display which they had when the adjusting method was begun. The sliders are thus stopped as it were, at the ends of the strip of numerical values and cannot protrude beyond these toward the outside, are thus stopped. If the pointing element continues to be moved in this direction, however, the minimum value can still be reduced further, or the maximum value can be enlarged further. During this process, the pointing element advantageously moves visibly further on the display and its movement changes the minimum value and the maximum value correspondingly as described before.

In a possible development of the invention, it can be provided that the current numerical value of the respective slider is displayed next to or in the minimum-value slider or next to or in the maximum-value slider. Alternatively, the numerical value can be displayed to which the position of this slider between minimum value and maximum value corresponds. This applies, in particular, when minimum-value slider or maximum-value slider are moved toward one another. Additionally, the previous minimum value or maximum value can be displayed, for example, at the previous location of the respective slider. Thus, an operator can see both the previous numerical value and the numerical value just newly set or the numerical value corresponding to the current location of the slider.

In a possible development of the invention, it can be provided that next to or in the minimum-value slider or the maximum-value slider, the previous minimum value or maximum value is indicated. A minimum value or maximum value corresponding to the current location can then be displayed at another location.

In an advantageous development of the invention, it can be provided for the range of numerical values that on the left, the minimum value is provided and, spaced apart from it, on the right the maximum value is provided. This extension in the horizontal direction from left to right starting from the minimum value corresponds to the instinctive quick understanding of an operator. In this context, it can be generally provided that in a starting state or original state, respectively, the initial minimum value is at 0 or at 1. The initial maximum value can be chosen to suit the corresponding application.

In a development of the invention it can be provided that a type of scaling or a type of representation of the original range of numerical values is also taken over for the new range of numerical values. Thus, for example, an originally linear representation or logarithmic representation of the original range of numerical values can also apply to the new range of numerical values. In another development, it can be provided that a first range of numerical values originally represented is very large or maximally large and has a logarithmic representation. This is generally considered to be advantageous for a representation or selection of numerical values with a limited width. If then a smaller range of numerical values is set which, in particular, is less than 1% to 5%, it is possible to change a linear representation. This corresponds better to the natural understanding and, in particular, when an aforementioned slider is to be moved along the range of numerical values on the display, it is easier to understand for an operator with a linear representation.

Apart from in the claims, these and other features are also found in the description and the drawings, wherein the individual features can be realized in each case by themselves or severally in the form of subcombinations in one embodiment of the invention and in other fields and represent advantageous embodiments capable of being protected by themselves for which protection is claimed here. The subdivision of the application into individual sections and intermediate captions does not restrict the statements made under these in their general validity.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
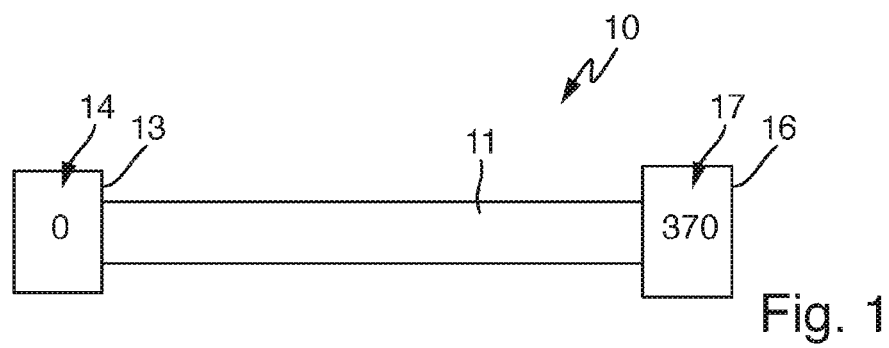
FIG. 1 is a schematic representation of how a range of numerical values for parameters is adjusted at an input device using the method according to an embodiment of the invention.

In FIG. 1, a strip of numerical values 11 is shown as section on a screen of an input device which is used as display 10, for example having a width of 5 cm to 10 cm. The strip of numerical values 11 has a left end and a right end. At the left end, a minimum-value slider 13 is shown in which the present minimum value, namely 0, is displayed as numerical value 14. In similar form, a maximum-value slider 16 is shown at the right end of the strip of numerical values 11, with a numerical value 17 inside, namely 370. The minimum value 0 and the maximum value 370 span between them the range of numerical values from 0 to 370 or form it, respectively. For components of an electrical drive system, for example the power, a power range or a design power for a power controller of such a drive system, whose design power is within this range could thus be displayed in a representation on the right next to the strip of numerical values 11. However, since this is the initial representation, no examples lying within this range of numerical values are yet shown for these parameters.

Figure 2:
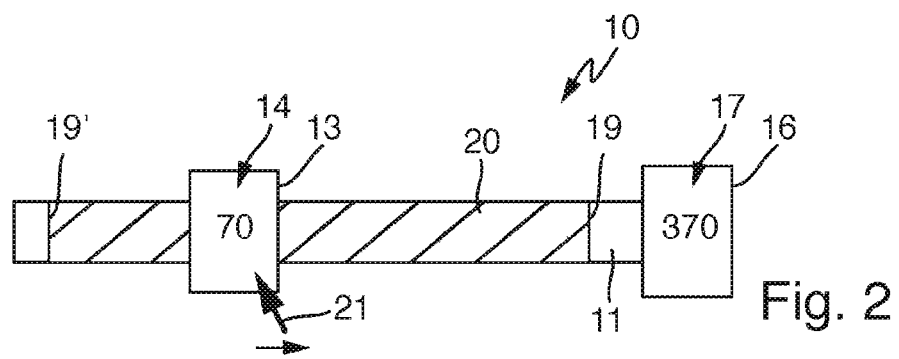
FIG. 2 is another schematic representation of how a range of numerical values for parameters is adjusted at an input device using the method according to an embodiment of the invention.

According to FIG. 2, the minimum-value slider 13 can be moved to the right or toward the maximum-value slider 15, respectively, in a first step for changing the range of numerical values with a pointing element 21. This is obviously used for enlarging the minimum value. In the position of the minimum-value slider 13 shown here, the corresponding numerical value 14 is 70 for the minimum value. This can be with a linear scaling along the strip of numerical values 11. Alternatively, this can also be logarithmically scaled so that a better setting is possible with smaller numerical values.

Figure 3:
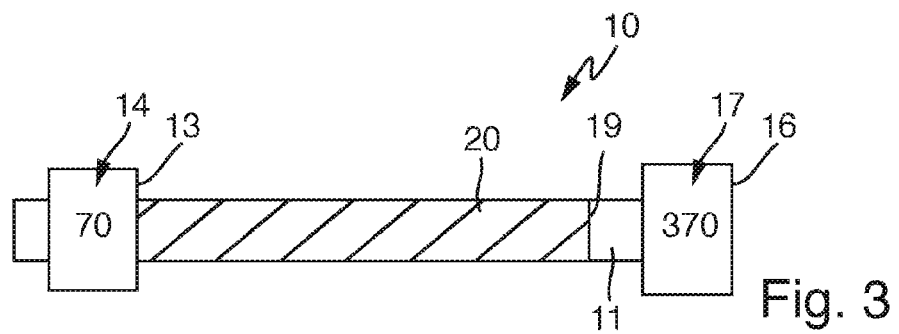
FIG. 3 is another schematic representation of how a range of numerical values for parameters is adjusted at an input device using the method according to an embodiment of the invention.

If then, by removing the pointing element 21 or releasing a left-hand mouse key by means of which the pointing element 21 has grabbed the minimum-value slider 13 for movement, the minimum-value slider 13 is released again, it returns independently in the direction of its starting position or of its original location. As can be seen in FIG. 3, the distance of the minimum-value slider 13 from the left-most end of the strip of numerical values 11, at which it was originally according to FIG. 1, is about 0.5 cm or 5% of the complete length of the strip of numerical values 11. Thus, it has not returned to its original location. By this means, an operator can recognize that the minimum value has been enlarged from the original minimum value of 0 to the current minimum value of 70. Furthermore, this serves for an improved setting as will still be explained in greater detail in the text which follows.

After the range of numerical values between minimum value and maximum value has been changed, as FIG. 2 already shows, the numerical values or at least the largest numerical value, respectively, for a corresponding parameter of one of the components appear, which can be selected overall. This is the numerical value 19 which, for example, is about 350. It is spanned fully to the left, that is to say to a smallest numerical value 19' for this parameter, a range 20. This range 20 then contains corresponding components or power controllers from the entire supply. The in each case individual power controllers are not shown here which, however, could also be done as is easily presented. For this purpose, they could also be shown as vertical dashes as for the numerical value 19. Additionally, the respective numerical value could be specified directly numerically next to these vertical dashes.

Figure 4:
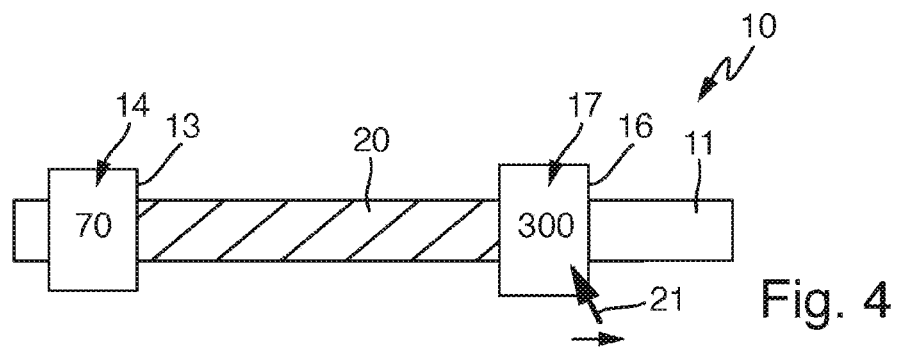
FIG. 4 is another schematic representation of how a range of numerical values for parameters is adjusted at an input device using the method according to an embodiment of the invention.
Figure 5:
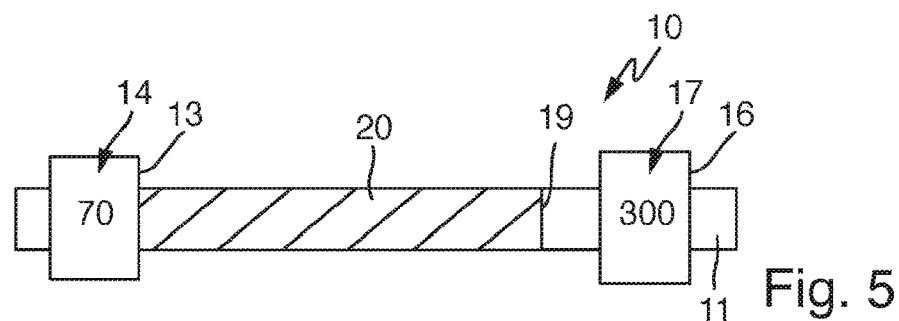
FIG. 5 is another schematic representation of how a range of numerical values for parameters is adjusted at an input device using the method according to an embodiment of the invention.

In order to narrow down or to reduce the range of numerical values even further, the maximum-value slider 16 can be grabbed according to FIG. 4 by means of the pointing element 21 and moved to the left or toward the minimum-value slider 13. In the maximum-value slider 16, the corresponding numerical value 17 is then displayed which is here about 300. The maximum-value slider 16 is then released or the pointing element 21 removed, respectively, or a left-hand mouse key is released again so that the maximum-value slider 16 returns independently in the direction of its original location. Similar as described before for the minimum-value slider 13, the maximum-value slider 16, however, does not return completely to its original location but stops shortly before it, for example also the aforementioned 0.5 cm or 5% of the length of the strip of numerical values 11. This is shown in FIG. 5. Now, the range of numerical values extends from 70 as minimum value to 300 as maximum value. A numerical value 19 as upper limit of the range 20 shown shaded can now be a lower value than before, for example 260, because it has clearly fallen out with the numerical value 350. This means that the possible power controllers have been restricted with a design power as parameters according to the numerical value.

Figure 6:
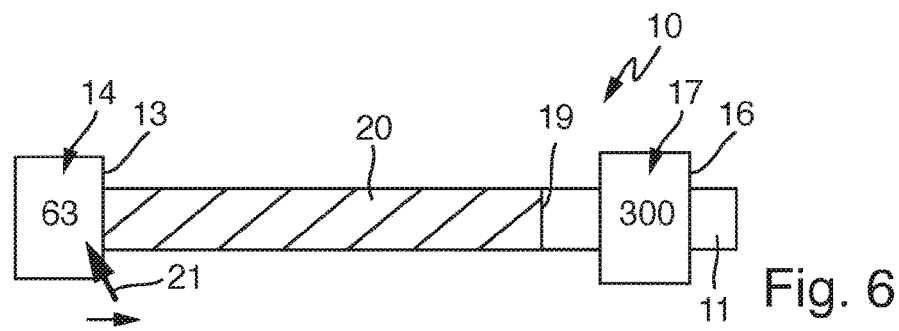
FIG. 6 is another schematic representation of how a range of numerical values for parameters is adjusted at an input device using the method according to an embodiment of the invention.

In FIG. 6 it is shown how the range of numerical values can be widened again, as it were, or the minimum value can be reduced again in concrete terms. For this purpose, the minimum-value slider 13 is grabbed by means of the pointing element 21, starting from FIG. 5, and moved to the left to the end of the strip of numerical values 11 or to its original location, respectively. It can then be provided here according to a first embodiment of the invention that, differently from moving the minimum-value slider 13 to the right or for enlarging the minimum value, respectively, there is no reduction or change of the minimum value corresponding to the distance passed but, similar as with a key switch or with a toggle method, the minimum value is changed only with a single step. Thus, the current minimum value can be reduced, for example, by 10% so that the new minimum value is now only 63. Instead of 10%, this could also be 5% or also 20%. If then, starting from FIG. 6, the minimum-value slider 13 were to be released again by deactivating the pointing element 21, it would return independently back into a position corresponding to FIG. 5 but still only indicate the minimum value 63, however, which would then be set, too.

This can be repeated several times, for example always in said steps of 10% reduction until a new desired minimum value is set.

Alternatively, according to a second embodiment of the invention, it could be provided that the reduction is not by a percentage proportion but by fixedly predetermined values which may depend on a size distribution of the minimum value. Thus, a reduction in steps of 1 or steps of 2 in each case could take place with minimum values of up to 10; and in steps of 5 or steps of 10 with a minimum value between 10 and 50. This can apply correspondingly also for changing the maximum value 17 with the maximum-value slider 16 which can be moved exactly correspondingly to the right to its original location according to FIG. 1 in order to enlarge the maximum value 17 again.

Figure 7:
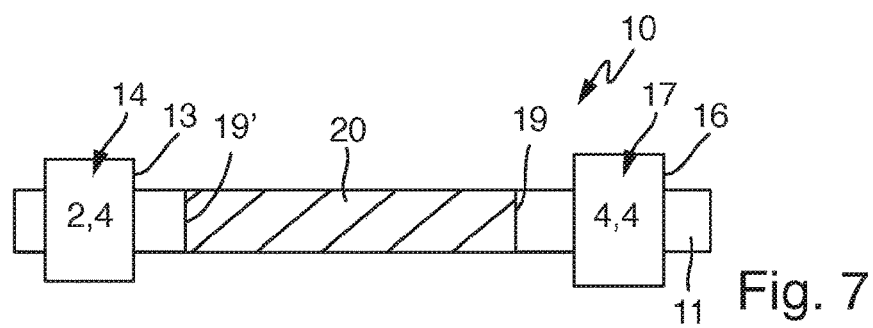
FIG. 7 is another schematic representation of how a range of numerical values for parameters is adjusted at an input device using the method according to an embodiment of the invention.

In FIG. 7 it is shown how the minimum value 14 is set to 2.4 and the maximum value 17 to 4.4 by a strong reduction. Minimum-value slider 13 and maximum-value slider 16 have about 0.5 cm distance to the extreme ends of the strip of numerical values 11. Within the sliders, numerical values 19 and 19' are shown for parameters for the design power of a power controller which form between them a shaded area 20.

Figure 8:
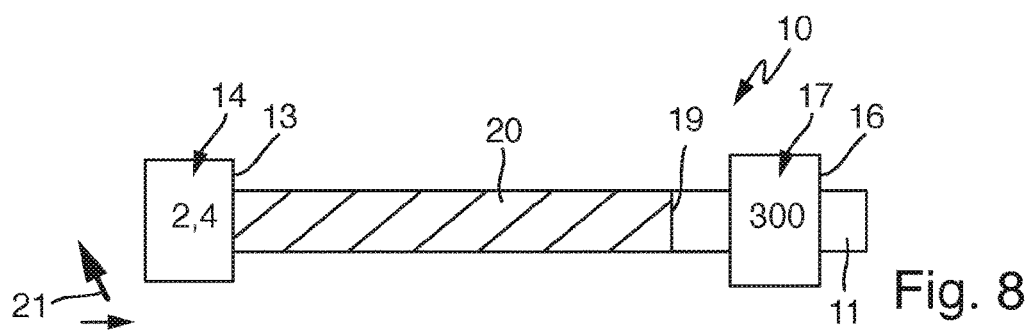
FIG. 8 is another schematic representation of how a range of numerical values for parameters is adjusted at an input device using the method according to an embodiment of the invention.

As a still further alternative third embodiment of the invention, it is shown in FIG. 8 how, starting from FIGS. 5 and 6, the minimum value 14 could be distinctly reduced by means of the pointing element 21. For this purpose, the pointing element 21 has first been set to the minimum-value slider 13 in accordance with FIG. 5 and has been moved toward the left into a position according to FIG. 6. By this means, the minimum value has been reduced by 10% to the value of 63. However, if the pointing element 21 is then moved distinctly further to the left, that is to say away from the minimum-value slider 13 which has moved to its stop, the numerical value 14 is distinctly reduced in this embodiment for the minimum value or further and specifically in accordance with the distance or path of the pointing element 21 from the location at which minimum-value slider 13 has found its stop to the left or could not be moved any farther. By moving the pointing element 21 to the left or to the right, the minimum value, as shown visibly, can thus be changed without it being necessary that the representation of the minimum-value slider 13 moves it even farther to the left. Thus, the minimum value of 2.4 shown in FIG. 8 can thus be set with the minimum value 70, starting from FIG. 5, with a single movement. This is because, similar to described before, it can also be provided that with low values for the minimum value a reduction no longer takes place in steps of 10 or steps of 5 but in steps of 1 or even steps of 0.1. In the representation of FIG. 8, too, the minimum-value slider 13 would return to the location shown in FIG. 7 after deactivation or release of the pointing element 21, therefore with some distance from the left-hand end of the strip of numerical values 11.

Correspondingly, a setting of the maximum value 17 can also apply for the maximum-value slider 16 as can be easily imagined.

Generally, it can be provided in the invention that a step sequence of the numerical values in these sliders can be dependent on their absolute size. If the maximum-value slider 16 is moved with a maximum value of between 300 and 370 in FIGS. 1 to 6, a rough step sequence in steps of 10 or even steps of 50 may be appropriate. If, according to these figures, the minimum value is set in a range between 63 and 70 in the case of the minimum-value slider 13, steps of 5 may be appropriate. In the case of numerical values 14 or 17, respectively, shown in FIG. 7, for the minimum value and the maximum value, steps of 0.5 or, for example with under 5 as numerical value, even steps of 0.1 may be appropriate. In this context, the respective minimum value or maximum value can be utilized as reference, alternatively the smallest numerical value 19' or the largest numerical value 19 for the existing parameters of the components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adjusting a range of numerical values at an input device for configuration or selection of components of an electrical drive system with regard to a parameter as numerical value, wherein the input device has a display on which a minimum value for the numerical value and a maximum value for the numerical value are displayed variably, the minimum value and the maximum value form between themselves a range of numerical values, the method comprising the steps of:

displaying a minimum-value slider as graphical element and displaying a maximum-value slider as graphical element with a distance therefrom, which graphical elements are movable in each case for changing the range of numerical values;

moving the minimum-value slider toward the maximum-value slider or away from it or moving the maximum-value slider toward the minimum-value slider or away from it;

reducing the minimum value in the case of moving the minimum-value slider away from the maximum-value slider and enlarging the minimum value in the case of moving the minimum-value slider toward the maximum-value slider in order to obtain a new minimum value;

reducing the maximum value in the case of moving the maximum-value slider toward the minimum-value slider and enlarging the maximum value in the case of moving the maximum-value slider away from the minimum-value slider in order to obtain a new maximum value;

changing the range of numerical values by spanning a new range of numerical values with the new minimum value or the new maximum value;

wherein, when moving the minimum-value slider or the maximum-value slider toward one another, the range of numerical values is reduced and wherein, when moving the minimum-value slider or the maximum-value slider away from one another, the range of numerical values is enlarged, wherein the minimum-value slider or the maximum-value slider return to a new location up to before their original location after being moved and released so that a new spacing between the sliders is between 60% and 99% of an original spacing between the sliders, and wherein the minimum-value slider or the maximum-value slider return to a new location of up to 1% to 20% of the original range of numerical values in front of their original location after being moved and released.

2. The method as claimed in claim 1, further comprising the steps of:

displaying the components whose parameters lie within the range of numerical values.

3. The method as claimed in claim 2, wherein said components are displayed on the display with spacing next to the minimum value and the maximum value.

4. The method as claimed in claim 1, wherein the parameter or parameters in the new range of numerical values are displayed by specifying the numerical value and/or by representing a graphical element at a location in the new range of numerical values which corresponds to the numerical value of the parameter.

5. The method as claimed in claim 4, wherein the parameter or parameters in the new range of numerical values are displayed as a dash or as a strip with a course transversely to a direction between the minimum-value slider and the maximum-value slider.

6. The method as claimed in claim 1, wherein on the display, a strip of numerical values is shown between the minimum-value slider and the maximum-value slider.

7. The method as claimed in claim 6, wherein the strip of numerical values is shown between an original location of the minimum-value slider and an original location of the maximum-value slider.

8. The method as claimed in claim 6, wherein the strip of numerical values remains unchanged during movement of the sliders.

9. The method as claimed in claim 6, wherein on or transversely over the strip of numerical values, a dash or strip with a course transversely to the direction between the minimum-value slider and the maximum-value slider are shown.

10. The method as claimed in claim 1, wherein
the display has a screen and changing the range of numerical values or moving the minimum-value slider and/or the maximum-value slider is carried out by use of a peripheral input device by which, in each case, a pointing element is controllable, and
the peripheral input device is selected from a group consisting of: a computer mouse, a track point or a touchpad.

11. The method as claimed in claim 1, wherein
the display has a touch-sensitive screen and changing of the range of numerical values or moving the minimum-value slider and/or the maximum-value slider takes place by placing a finger onto the touch-sensitive screen on or over the minimum-value slider or on or over the maximum-value slider and subsequently moving toward or away from one another, wherein a pointing element is controllable by the finger.

12. The method as claimed in claim 1, wherein after moving the minimum-value slider or the maximum-value slider, their release has the effect that the numerical value existing at this instant is accepted as a new minimum value or a new maximum value.

13. The method as claimed in claim 1, wherein the minimum-value slider or the maximum-value slider return to their original location after being moved and released.

14. The method as claimed in claim 1, wherein a reduction of the minimum value occurs after previous enlargement by moving of the minimum-value slider away from the maximum-value slider to the original location of the minimum-value slider, wherein a single such moving reduces the minimum value by a predetermined proportion of the current minimum value.

15. The method as claimed in claim 14, wherein a single such moving reduces the minimum value by 5% to 50%.

16. The method as claimed in claim 1, wherein an enlarging of the maximum value occurs after previous reduction by moving the maximum-value slider away from the minimum-value slider to the original location of the maximum-value slider, wherein a single such moving enlarges the maximum value by a predetermined proportion of the current maximum value.

17. The method as claimed in claim 16, wherein a single such moving enlarges the maximum value by 5% to 50%.

18. The method as claimed in claim 1, wherein
in the case of an attempted moving of the minimum-value slider or of the maximum-value slider by a pointing element away from one another, the minimum-value slider and the maximum-value slider cannot be moved out beyond their, in each case, original location on the strip of numerical values on the display, and
with further movement of the pointing element in this direction of moving, the minimum value is reduced or the maximum value is further enlarged.

19. The method as claimed in claim 1, wherein next to or in the minimum-value slider or the maximum-value slider the current numerical value of this slider is displayed or the numerical value is displayed to which the position of this slider between the minimum value and the maximum value corresponds.

20. The method as claimed in claim 1, wherein next to or in the minimum-value slider or the maximum-value slider the previous minimum value or maximum value is indicated.

21. The method as claimed in claim 1, wherein on the left, the minimum value and spaced apart from it on the right the maximum value are shown as a range of numerical values.

22. The method as claimed in claim 21, wherein at the beginning of the method the minimum-value slider is moved up to the minimum value and the maximum-value slider is moved up to the maximum value.

23. The method as claimed in claim 1, wherein a type of scaling or type of representation of the original range of numerical values is taken over for the new range of numerical values.

24. The method as claimed in claim 23, wherein the type of scaling or the type of representation of the original range of numerical values for the new range of numerical values is selected from the group consisting of: a linear representation, or a logarithmic representation.

* * * * *